United States Patent Office 3,343,973
Patented Sept. 26, 1967

3,343,973
FRACTURED CLAY
Robert F. Billue, Tennille, Ga., assignor to Thiele Kaolin Company, Sandersville, Ga., a corporation of Georgia
No Drawing. Filed June 30, 1966, Ser. No. 561,727
13 Claims. (Cl. 106—288)

This application is a continuation-in-part of my copending application Ser. No. 196,522, filed May 21, 1962, now abandoned, which is a division of my copending application, Ser. No. 813,658, filed May 18, 1959, issued as Patent 3,058,671, which, in turn, is a continuation-in-part of my copending application Ser. No. 611,757, filed September 24, 1956, now abandoned.

This invention relates to a fractured clay. More specifically, this invention relates to fractured clay suitable for coating paper having markedly greater brightness than unfractured clay of substantially the same size and source.

The clay that is used for coating paper is graded according to its brightness, opacity-creating ability, and the brightness values referred to herein were determined in accordance with TAPPI tentative standard T 646 M-54, using a General Electric brightness meter.

Clay as mined from the ground in the United States consists of a multitude of particles of different sizes ranging from submicroscopic up. It has become convenient in recent years to refer to clay used for coating paper by identifying the percentage by weight of the particles above and below 2 microns (i.e., 2 microns equivalent spherical diameter). The most expensive coating clays usually have more than about 90% by weight of their particles below 2 microns. This clay, when unbleached, generally has a top brightness of about 85-86, and a brightness of about 87 when bleached.

The majority of the coating clays have from 70-80% by weight particles below 2 microns, and the best of these U.S. clays, when unbleached, have a brightness of about 84-85, and a bleached brightness of about 86-87. The coarse clays or filler clays contain between about 30-55% by weight particles below 2 microns and have a lower brightness.

It has been possible to increase the brightness of U.S. clays by calcining them, but this process makes the clay too hard for use as a good coating clay.

In "Fundamentals of Ceramics," 2nd Ed., by McNamara and Dulberg, published by Mineral Industries Extension Services, The Pennsylvania State University, University Park, Pennsylvania, it is reported on pages 57, 59, 63, that when clay is heated, it tends to lose water. This publication further states that it is thought that the bonds which occur between alumina and silica are changed or destroyed at dehydration temperatures. Further, after the clay is subjected to dehydration temperatures, the ability of the clay to rehydrate is permanently lost, and the mineral will no longer take up water and become plastic. When clay is heated from 20° to 600° C., it decreases in weight because of the loss of water. Although the publication states at page 59 that no direct comparison can be drawn between chemically combined water and plasticity, clay which has been heated to about 600° C. is not plastic and is no longer a clay but is instead a mixture or compound of alumina and silica. On page 59, the book states that when clay minerals are heated above dehydration temperatures to about 900-950° C., another reaction takes place, and that although the exact reaction is not known, its character indicates that there is a reaction beween $Al_2O_3$ and $SiO_2$ resulting from the decomposed kaolinite.

I have found how a clay of intermediate particle size range—that is, around 70-80% below 2 microns—may be greatly increased in brightness without in any way necessitating sacrificing softness. My fractured clay product, for example, attains an unbleached brightness of about 88-90 and a bleached brightness of about 89-91. This is done, for example, by separating coarse clay from the natural or crude clay, and then fracturing this coarse clay to produce particles within the desired particle size range, and separating the desired fractured particles from the mass produced from the fracturing step.

I end up, for example, with a clay 78% below 2 microns and having a brightness of about 88 as compared to a brightness of about 83 for particles of the same size range in the same clay as taken from the ground. While a difference of five points of brightness may seem slight to those unfamiliar with the coating clay art, this represents several times the difference in brightness between the coarsest and finest clays and for the first time permits U.S. clays of coating softness to compete with English clays in brightness.

In producing coating grade clay for the paper industry, lumps of flocculated clay are taken from the mine and placed in a blunger along with water and a dispersant such as sodium silicate. After the mix is treated in the blunger, deflocculated clay slip is produced. The clay slip is then subjected to a series of degritting steps during which grit and mica are removed. The degritted clay is then subjected to a classification step that separates the (classified clay) fine coating grade clay (e.g., 67-90% by weight below two microns) from the coarse, residual non-coating grade clay (e.g., 19-26% by weight below 2 microns). This separation may be conducted in a settling tank, centrifuge, or hydroseparator. The classified, fine coating grade clay may be classified as a finer fraction of classified clay (e.g., 80-90% by weight below 2 microns) or as a coarser fraction of classified clay (e.g., 67-70% by weight below 2 microns). The coarse residual clay that is separated from the coating grade clay represents considerable waste due to an inadequate market.

The coarse residual clay that is separated by classification from the fine coating clay may be subjected to a reclaiming step so as to recover filler grade clay (e.g., 30-55% or more commonly 40-55% by weight below two microns), thereby leaving waste clay fraction consisting of a coarse clay (e.g., 10-20% by weight below two microns) which is generally discarded as unused waste, although in some instances some filler grade clay may be obtained from it. If desired, filler grade clay may also be prepared by mixing a coarse clay with finer clay particles. But in either event, there is an inadequate market for the filler grade clay and it is sold at prices well below the prices of coating grade clay.

Generally, the above procedure produces a percent recovery from the crude clay, for example, of about 50-65% by weight classified clay, about 12% by weight filler grade clay, and about 23-38% by weight waste clay.

I have discovered that clay of superior brightness, equal to English clays and calcined domestic clays, may be produced from clays, e.g., kaolin clay) that hitherto have been discarded or represent considerable waste due to an inadequate market, and when sold, sell at comparatively low prices, without necessitating calcining the clay and without producing the hardness that results from calcination. The clay that is produced by my process has markedly greater brightness and gloss than untreated particles of clay of substantially the same size and from the same source. In my process, I may use either coarse clay after removing the fines so that there are substantially no particles finer than 2 microns, or, with a little less brightening improvement, mined, coarse crude clay. However, the coarse clays that I use, irrespective of whether they are coarse crude clays or coarse clays obtained from classification, must have not more than 35% by weight particles below two microns.

Kaolin clay as it comes from the ground, and particularly with reference to Georgia clays, will contain a small percentage of impurities such as sand and mica. These impurities are normally removed in a preliminary washing operation. The degritted clay, with such small percentage of impurities as cannot readily be removed, contains particles of a wide range of size and in at least two states of division.

Kaolin clay crystals are hexagonal plates which are considered to be, for example, from about 6 to about 24 times as wide as they are thick. Such plates are relatively rare above 3 to 5 microns, at least in clay which has been mined, blunged in order to disperse it, washed and then sedimented.

The plates in nature are frequently, if not normally, stacked one upon the other to form what is called worms of stacks. Just as it is possible to peel one sheet of mica from a block of mica occurring in nature, so it is possible to separate the adjacent plates in a stack of clay plates. The method, however, is different since the clay particles are so much finer and smaller. Mellor, in "Inorganic Chemistry," vol. VI, page 476, points out that these aggregates of plates may be spread out like a deck of cards fanwise if pressed between a pair of cover glasses. In doing so it is advisable to use a drop of heavy oil to lubricate the spreading.

Observations of particle size distribution in clay are made by sedimentation methods in which it is assumed that the plates act as spheres of the same diameter (equivalent spherical diameter) in respect to their settling speed. (The exact relationship and correlation between equivalent spherical diameter and microscopic face diameter have not been resolved with certainty.) No adequate data is available to show the effect of stacks upon the meaning of sedimentation determination; but obviously a stack 2 microns across and 2 microns thick consisting of 12 to 24 plates would be expected to settle faster than the 12 to 24 plates separated into their individual identities.

The situation is further complicated by the fact that clay has entirely different properties when it is floucculated as compared to when it is deflocculated. The difference between flocculated and deflocculated clay can be dramatically shown. Everyone is familiar with the clingy character of clay in the ground when it has just enough water to make it barely plastic. Such clay will normally have a solids content between 60% and 70%. The addition of a single drop of a dispersing agent such as tetrasodium pyrophosphate will change a mass of such clay to a milky suspension flowing like or almost like water. Just what happens when the clay flocculates is not known, but it is surmised that the plates or particles agglomerate under the effect of the electrical charges into some kind of clusters or aggregates. Whatever the nature of these clusters or aggregates, they can be readily broken down by the use of a dispersing agent. However, this breaking down appears to have not relationship to the stacks which are not formed or broken down by flocculation or defloculation.

Brightness is normally measured upon the clay itself but may also be measured upon paper which has been coated with a standard weight of a standard coating composition including the clay and a binder. The brightness is read upon a General Electric brightness meter which measures the intensity of a wavelength of light, 457 m$\mu$ reflected at an angle close to perpendicular of the plane of the sample surface. Readings so obtained will be different from those of the clay, and may not even corespond, i.e., a high brightness clay may not produce as high a paper brightness as another clay having a little less brightness.

The gloss of clay which is also measured by the reflectance of light from paper coated with a standard weight of a standard coating composition is made at a smaller angle of reflectance and is always made commercially upon paper which has been coated and then calendered.

It was discovered a long time ago that sedimentation could be employed to separate clays to get a larger and larger proportion of small particles in the final product. Because of an agreement of a combination of early clay producers, it became the practice to define particle size range by reference to a theoretical 2 micron size. It turned out, as expected, that within practicable limits, the finer the particle size the greater the gloss of paper treated with such clay. In fact, gloss increases were tremendous as the average particle size was reduced.

However, no corresponding marked increase occurred in brightness with the separation of the finer particles of the clay. This was rather surprising inasmuch as the British clays of small particle size had both high gloss and high brightness; but no great increase of brightness occurred with U.S. clays as the particle size from a particular source or mine was reduced by sedimentation, although there was a significant increase in gloss.

One of the first to advocate the use of sedimented clay for coating purposes was U.S. Maloney Patent 2,158,987. In his patent, Maloney also recommended the use of as much as three hours of treatment in a pebble mill as a supplement to sedimentation as a means of reducing particle size. There is no indication that such milling will accomplish any increase in brightness and Maloney did not say so. Further, the Maloney patent does not distinguish between the sizes of clay to be treated, or attribute any critical importance to the particles size distribution of the clay to be treated.

Various suggestions have been made for using mechanical means to disintegrate clays by one method or another, U.S. Asdell Patent 2,726,813 suggested a comminution of clay in a gaseous stream. He reported a comparable gloss but showed a reduction in the brightness of the clay itself when compared with the sedimented clay of comparable fineness.

It was early discovered that calcining clay would increase the brightness, but this calcining makes the clay unfit for many paper coating purposes, and prior to the time of the present invention no method had been discovered for appreciably increasing the brightness of a clay which would leave the clay suitable for paper coating.

As pointed out above, in "Fundamentals of Ceramics," it is reported that when clay is heated, it loses water, and, at dehydration temperatures, that it is thought that the bonds that occur between alumina and silica are changed or destroyed. Further, when the clay is heated to about 600° C. or above, it is no longer plastic.

When coarse clay is fractured in accordance with my invention, the resulting fractured clay has markedly greater brightness and gloss than unfractured particles of clay of substantially the same size from the same crude clay. This remarkable property of increased brightness is certainly new and is entirely unexpected and unobvious. Thus, my invention involves more than improving the brightness of the clay by merely reducing the size of its particles.

In practicing my invention, it is essential that the coarse clay that is to be fractured have not more than 35% by weight of particles below 2 microns. (In giving particle size herein, I refer to the effective apparent spherical diameter of the particles as determined by sedimentation means such as the Bouyoucus hydrometer or pipette analysis. While the results obtained by the use of the hydrometer will vary slightly, depending upon the preliminary treatment of the clay and other factors, the differences between various procedures are not generally of significance so far as this invention is concerned. However, a pipette analysis is used when there is not a homogeneous mixture of particles or when there is almost no particles under a given size and it is desired to measure to that given size. The particle sizes are given for qualitative rather than quantitative guides.) This enables a comparatively high proportion of the coarse clay to be fractured and affords a better opportunity of fracturing the same particles more than once. Thus, coarse crude clays that were formerly considered too coarse to be economically mined for conventional classification procedures due to the low recovery of fine particles may now be treated in accordance with my invention, thereby producing a fractured product that may be advantageously used for coating paper. Clay having this particle size distribution may be obtained by classifying the crude clay to remove the requisite level of particles below 2 microns. Prior to fracturing, colloidal clay material of less than about 0.1 micron may be removed from the clay that is to be treated.

The coarse clay may then be admixed with water and deflocculating agent and the resulting charge fractured in a plug mill of the type shown in U.S. Millman et al. Patent 2,535,647 or a Rafton Mill such as shown in U.S. Rafton Patent 2,448,049. When a pug mill is used, the charge should contain about 75–90% by weight solids. I prefer to use a charge of about 60–65% by weight solids in the Rafton Mill.

The charge must be subjected to treatment for sufficient time to produce (e.g., fracture and recover by classification) a fractured product having at least about 40% by weight, preferably at least about 50% by weight, clay finer than 2 microns and fracture-induced brightness that is markedly brighter than unfractured coarse clay of substantially the same size from the same source.

The percentage of coarse clay that is fractured may be measured with some degree of precision by classifying the coarse clay to the same particle size distribution as the fractured clay; the amount of clay removed from the coarse clay by this classification, as expressed as a percent of the weight of the coarse clay prior to classification, represents at least the minimum percent of clay that was fractured.

It has been noted that the fractured coarse clay that has been treated so that it has at least about 40% by weight clay below 2 microns, preferably at least about 50% below 2 microns has greater brightness and gloss and a higher viscosity than unfractured clay having the same particle size distribution from the same source. In addition, it has been noted from studying several samples of fractured clay that the fractured clay particles have substantially no worms or vermicules oriented so that the plates are substantially perpendicular to the supporting plane; this was determined by an electron micrograph study that was conducted by thoroughly mixing fractured clay and water, and positioning the admixture on a horizontal supporting structure, from which readings were taken. Further, aqueous slurries containing at least 55% by weight of my fractured coating grade clay stiffens when agitated or subjected to shearing forces. This is called dilatancy and is believed to be caused by a change from close packing, where there is sufficient water for lubrication, to a more open packing where there is too small volume to fill the voids. It has been noted that slurries (containing at least 55% by weight solids) prepared with samples of my fractured clay showed greater dilatancy than slurries (having the same weight level of solids) prepared with unfractured clay having the same particle size distribution. Still further, it has been observed that the fractured clay particles require more casein (e.g., about 1–2 additional parts of casein for 100 parts of clay) for coating (Bird Applicator) paper (uncalendered sheets) as compared with unfractured clay of the same particle size distribution, in those instances where a Dennison wax pick of No. 4 was obtained and a coat weight of about 12 pounds was applied per ream (TAPPI book ream of 500 sheets of 25 inches by 38 inches); that is, about 12–13 parts of casein were used with 100 parts of fractured clay in the coating mix, as compared with about 11 parts of casein with 100 parts of unfractured clay.

It has also been observed that the fractured clay product has a substantially improved blue-white color as compared to unfractured clay of the same particle size that is at least comparable with that of imported English clays of the same particle size distribution; has a considerably whiter color as compared to unfractured clay of the same particle size; is substantially free of unfractured worms or unfractured vermicules and is composed substantially of fractured remanents of vermicules; contains a sufficient amount of clay particles of more than 2 microns in size (electron micrograph face diameter) so as to predominate on a weight basis in at least some instances; and gives uncalendered coated paper having improved brightness, color and gloss and, if calcined, gives a calcined product having an increased brightness and color. When the fractured product has clay particles in excess of 2 microns in size (face diameter under electron microscope), most of the particles in excess of 2 microns have a ratio of diameter to thickness, as determined by an electron micrograph, in excess of 6 and when compared to unfractured clay of comparable particle size a larger number of particles with a ratio of diameter to thickness which increases as the diameter of the particles increases.

It has been noted that when coarse domestic kaolinitic clay having not more than 35% by weight particles finer than 2 microns are sufficiently fractured by milling, for example, with mills such as a Rafton Mill (see U.S. Patent 2,448,049), a pug mill (see U.S. Patent 2,535,647), a sand mill having a cylindrical tank, an agitator and sand or other milling media, a Vibro-Energy Mill, a ball mill, and a Waring Blendor, and the fractured clay is then classified to at least 67% by weight finger than 2 microns (equivalent spherical diameter), the resulting products, when observed under an electron microscope, have, in varying degrees, an appearance of being thinner (thickness), more irregularly outlined, and less hexagonal but in at least some instances having a more regular and uniform surface than naturally occurring (unfractured) clay particles of the same equivalent spherical diameter. These differences in thickness and surface smoothness are particularly noticeable as the particles increase in size. The differences in outline and hexagonal appearance become less noticeable as the particles increase in size. At the same equivalent spherical diameter, the fractured-classified clay particles have a larger microscopic diameter than the unfractured particles. When classified mill-fractured remnants of naturally occurring larger clay particles have at least 67% by weight clay particles finer than 2 microns (equivalent spherical diameter), in at least some instances the clay contains a sufficient amount of clay particles of more than 2 microns (electron micrograph face diameter) in size so as to predominate on a weight basis.

Depending upon the coarseness of the starting clay to be fractured (not more than 35% by weight finer than 2 microns), the degree or extent of fracturing, and extent of post classification, the particle shape differences noted in the paragraph above may vary to a somewhat lesser or greater degree.

After fracturing, the amount of clay particles finer than 2 microns is increased by at last about 15% by weight and the resulting clay product should then be classified to provide for the recovery of clay having a still higher weight percent of clay particles finer than 2 microns and higher brightness. For example, the 15% weight increase may be ultimately obtained by a series of fracturing steps comprising first increasing by fracturing the amount of clay finer than 2 microns by a value less than 15% by weight, then classifying and then repeating the fracturing-classifying steps. The resulting clay product has greater brightness than clay of substantially the same size that is produced from classifying crude clay, and the recovery or yield of clay finer than 2 microns is greater. Still further the clay may be subjected to or recycled for repeated fracturing steps or fracturing operations, and fractured clay recovered or withdrawn therefrom having at least 40% by weight particles below 2 microns, thereby providing recovered or withdrawn clay which in effect has been classified from the clay that is to be subjected to further fracturing and recovered or withdrawn clay product which constitutes classified mill-fractured remanents of naturally occurring larger clay particles having not more than 35% by weight particles below 2 microns.

Example II, infra, shows that my fractured clay produces greater brightness readings than a commercial intermediate grade of coating clay having substantially the same particle size distribution. In addition, Example II shows that when fractured clay that had an initial brightness of 89.1 was calcined, the resulting product had a brightness of 96.3. This 96.3 value is considerably above the brightness of 90–92 which is obtainable by calcining regularly produced coating clays of the same fineness.

It should be noted that Table XIII in Example VII, infra, shows that paper that was coated with bleached fractured clay had significantly greater brightness than paper that was coated with bleached commercial intermediate grade coating clay having substantially the same particle size distribution. Similar results are shown in Table XVI in Example VIII, infra.

Example IX, infra, clearly shows: that my fractured clay has greater brightness than conventional intermediate grade coating clay having substantially the same particle size distribution; the outstanding brightness and coating properties of my fractured coating clay, as compared to intermediate grade coating clay and calcined coating clay; and that calcined coating clay is far more abrasive than my fractured coating clay.

The test data set forth in Table XIX in Example X, infra, show that: unbleached fractured clay has significantly greater brightness than unfractured clay of substantially the same particle size distribution; and bleached fractured clay has markedly greater brightness than bleached unfractured clay of substantially the same size despite the fact that the former was treated with comparatively lower levels of bleach.

The data set forth in Example XI, infra, show that the brightness of the clay increased as its particle size decreased to 0.2 micron, and that fractured clay in the ranges of 0.5–0.2 micron and 5–0.5 microns was brighter than unfractured clay and that the brightest fractured clay fraction that was tested was in the 0.5–0.2 micron range.

*Example I*

Two samples were prepared from a coarse clay, one of which contains substantially all of its particles above 10 microns and the other having approximately all of its particles 5 microns and larger. Both samples were obtained by repeated classification of the clay.

Each of these samples was run through a Rafton Mill at 50% solids in deflocculated state. The clay slip was sprayed from nozzles immediately adjacent to the blade into the path of the teeth of the rotating saw. A number of passes through the machine were made, as desired.

The following Table I shows the particle size distribution (expressed as percent by weight) of the samples before and after fracturing.

TABLE I

| Particle Size | 10 micron fraction | | 5 micron fraction | |
| --- | --- | --- | --- | --- |
| | Before | After | Before | After |
| Percent plus 15 microns | 31.0 | 2.0 | 14.0 | 1.0 |
| Percent 15 to 10 microns | 52.0 | 6.0 | 22.0 | 5.0 |
| Percent 10 to 5 microns | [1] 17.0 | 25.0 | 56.0 | 22.0 |
| Percent 5 to 2 microns | 0 | 26.0 | [2] 8.0 | 33.0 |
| Percent finer than 2 microns | 0 | 41.0 | 0 | 39.0 |

[1] Represents all the particles under 10 microns.
[2] Represents all the particles under 5 microns.

The brightness of the 10 micron sample before treatment was 76.5. After treatment it was 84.0.

The 5 micron sample before treatment had a brightness of 75.6. After treatment it had a brightness of 82.4.

Both after-treatment brightness were determined upon the entire sample.

The fractured samples were then fractionated into a number of samples of different particle size ranges and again tested for brightness. The 10 micron fractured sample was classified into a fraction which had no particles above 10 microns and 72% of its particles 2 microns or below. The classified fractured sample had a brightness of 89.2.

Another classified sample of the 10 micron fractured sample had no particles above 10 microns, 87% of its particles 2 microns and below, and a brightness of 89.4.

The 5 micron fractured sample was divided into two classified groups—one of which had 62% of its particles 2 microns and below, and the other of which had 84% of its particles 2 microns and below. Neither group had any particles above 10 microns. The 62%–2 micron fraction had a brightness of 88.4. The 84.0%–2 micron fraction had a brightness of 89.5.

*Example II*

A special composite sample was made up from the foregoing classified fractured samples of Example I with the particle sizes distributed in approximately the same proportion as a sample of a commercial intermediate grade of coating clay from the same mine. These samples had about 80% of their particles below 2 microns. Coating compositions were made up from each of these (i.e., composite and commercial) samples and applied to paper to provide a 6A wax pick, which required a little more casein for the fractured clay than for the normal intermediate clay. The coating weights were substantially the same, being 14.7 pounds per ream for the fractured clay and 14.0 pounds per ream for the other (500 sheets of paper 25 in. x 38 in. constitute a ream). Uncalendered gloss as measured by a Hunter Meter was 6.6 for the fractured clay and 5.0 for the intermediate coating. Brightness was 83.2 for the fractured clay coating and 76.6 for the intermediate clay coating.

Another sample of the fractured clay which had an initial brightness of 89.1 was calcined at 1800° F. The resulting brightness was 96.3—considerably above the brightness of 90–92 which is obtainable from calcining regularly produced coating clays of the same fineness.

The special composite sample was tested for its reaction to various proportions of sodium hydrosulphite bleach after the preparation of the coated sheets. The following brightness values were obtained:

TABLE II

| Brightness: | Lbs. of bleach/ton of clay |
| --- | --- |
| 89.1 | 0 |
| 89.9 | 1 |
| 90.4 | 2 |
| 90.4 | 3 |

*Example III*

A sample of the coarse clay fraction produced in the commercial manufacture of intermediate grade coating clay was settled repeatedly from an aqueous suspension in preparation for being fractured in a laboratory Rafton Mill. After each settling the fines were discarded that were left in suspension after a predetermined time, and the resulting coarse particles were resuspended and settled to further remove remaining fine particles. The time of settling in each case was the time for the 2 micron size particles at top of suspension to settle out in bottom of container.

The particle sizes of the coarse fraction from the repeated settlings, as shown in Table III, was treated in the laboratory Rafton Mill at about 50% solids in a deflocculated state for 58 passes.

TABLE III.—PARTICLE SIZE BEFORE RAFTON TREATMENT

Percent:
| | |
|---|---|
| Plus 15 microns | 8.5 |
| 15 to 10 microns | 12.0 |
| 10 to 5 microns | 46.0 |
| 5 to 2 microns | 30.5 |
| Finer than 2 microns | 3.0 |

The fractured sample was fractionated to recover a fraction of finer particles of which about 78.0% were finer than 2 microns. This sample of fractionated fines from the Rafton Mill-treated clay tested as follows:

TABLE IV

[Percent recovery, 37.8; particle size, about 78.0% finer than 2 microns]

| Brightness: | Lbs. of bleach ¹/ton of clay |
|---|---|
| 87.0 | 0 |
| 88.5 | 1 |
| 90.0 | 2 |
| 89.7 | 3 |

¹ Sodium hydrosulphite.

*Example IV*

A sample of a whole coarse dry fraction that settled out in bottom of the settling tank used in the commercial manufacture of commercial intermediate grade coating clay was used for this run. This sample was deflocculated and run through a laboratory Rafton Mill at 60.0% solids for a total of 58 passes. The following results were obtained before and after fracturing the sample:

TABLE V

| | Before Fracturing | After Fracturing |
|---|---|---|
| Particle Size: | | |
| Percent plus 15 microns | 7.0 | 1.0 |
| Percent 15 to 10 microns | 13.0 | 3.0 |
| Percent 10 to 5 microns | 34.0 | 19.0 |
| Percent 5 to 2 microns | 21.0 | 32.0 |
| Percent finer than 2 microns | 25.0 | 45.0 |
| Brightness | 78.5 | 82.0 |

This fractured sample was fractionated to recover a fraction of finer particles, which tested:

TABLE VI

| | Lbs. of Bleach*/Ton of Clay | | | |
|---|---|---|---|---|
| | 0 | 1 | 2 | 3 |
| Brightness | 86.4 | 87.3 | 87.7 | 87.7 |

*Sodium hydrosulphite.

Particle Size:
| | |
|---|---|
| Percent plus 10 microns | 0.0 |
| Percent 10 to 5 microns | 2.0 |
| Percent 5 to 2 microns | 20.0 |
| Percent finer than 2 microns | 78.0 |
| Percent recovery | 52.8 |

*Example V*

A sample of the coarse clay fraction produced in the commercial manufacture of intermediate grade coating clay was settled repeatedly from an aqueous suspension in preparation for running through a laboratory Rafton Mill. After each settling, the fines were discarded that were left in suspension after a predetermined time and the resulting coarse particles resuspended and settled to further remove remaining fine particles. The resulting coarse fraction from the repeated settlings was treated in the laboratory Rafton Mill at about 50% solids in a deflocculated state for a total of 58 passes. The following results were obtained before and after fracturing the sample:

TABLE VII

| | Before Fracturing | After Fracturing |
|---|---|---|
| Particle Size: | | |
| Percent plus 15 microns | 3.0 | 1.0 |
| Percent 15 to 10 microns | 14.0 | 2.0 |
| Percent 10 to 5 microns | 59.0 | 20.0 |
| Percent 5 to 2 microns | 20.0 | 39.0 |
| Percent finer than 2 microns | 4.0 | 38.0 |
| Brightness | 73.0 | 80.0 |

The fractured sample was fractionated to recover a fraction of finer particles, of which about 78.0% was less than 2 microns. This fraction of finer particles tested:

TABLE VIII

| | |
|---|---|
| Brightness (unbleached) | 88.2 |
| Recovery, percent | 49.7 |

*Example VI*

A sample of crude clay that tested 66% finer than 2 microns was settled repeatedly until substantially all clay finer than 2 microns was removed. The resulting coarse fraction was put through a laboratory Rafton Mill at 59.4% solids in a deflocculated state for a total of 58 passes. This tested as follows:

TABLE IX

| | Before Fracturing | After Fracturing |
|---|---|---|
| Particle Size: | | |
| Percent 15 microns | 10.0 | 1.0 |
| Percent 15 to 10 microns | 10.0 | 2.5 |
| Percent 10 to 5 microns | 25.0 | 14.5 |
| Percent 5 to 2 microns | 43.0 | 35.0 |
| Percent finer than 2 microns | 12.0 | 47.0 |
| Brightness | 78.2 | 81.8 |

The treated sample was classified to varying fineness fractions and was tested. The following values were obtained:

TABLE X

| Percent Finer Than 2 Microns | Brightness | | Percent Recovery |
|---|---|---|---|
| | Without Bleach | 2 Lbs. of Bleach* per Ton of Clay | |
| 61.0 | 84.6 | 85.4 | 78.3 |
| 67.0 | 86.3 | 86.8 | 67.1 |
| 75.0 | 87.4 | 87.8 | 52.7 |

*Sodium hydrosulphite.

*Example VII*

A sample of the whole coarse clay fraction produced in the commercial manufacture of intermediate grade coating clay that settled out in the bottom of the settling tank was put through a laboratory Rafton Mill at 55.0% solids in a deflocculated state for a total of 80 passes. This tested as follows:

TABLE XI

| | Before Fracturing | After Fracturing |
|---|---|---|
| Particle Size: | | |
| Percent plus 15 microns | 8.0 | 1.0 |
| Percent 15 to 10 microns | 14.0 | 3.0 |
| Percent 10 to 5 microns | 31.0 | 16.0 |
| Percent 5 to 2 microns | 33.0 | 30.0 |
| Percent finer than 2 microns | 14.0 | 50.0 |
| Brightness | 78.6 | 82.6 |

The fractured clay was classified and tested as follows:

TABLE XII

| Percent Finer Than 2 Microns | Brightness | | Percent Recovery |
| --- | --- | --- | --- |
| | Without Bleach | 2 Lbs. of Bleach* per Ton of Clay | |
| 64.0 | 86.4 | 87.6 | 65.5 |
| 74.0 | 87.6 | 88.6 | 56.0 |
| 80.0 | 87.5 | 88.7 | 36.0 |

*Sodium hydrosulphite.

Coated sheets were prepared with clay fractions of 74.0% finer than 2 microns with two pounds of sodium hydrosulphite bleach and with commercial intermediate grade coating clay of a fineness of 81% finer than 2 microns having a brightness of 86.3. The following data were obtained with these sheets:

TABLE XIII

| Coating Clay Used | Gloss | Ct. Wt. | Wax | Brightness | Parts Casein Used per 100 Parts Clay [3] |
| --- | --- | --- | --- | --- | --- |
| Commercial Intermediate Grade Coating Clay | 8.0 | 12.3 | [1] 4 | 78.9 | 10 |
| 74% minus 2 fractions treated with 2 lbs. of bleach [2] per ton of clay | 9.0 | 12.1 | [1] 4 | 82.8 | 13 |

[1] Slight.
[2] Sodium hyrosulphite.
[3] Casein is the bonding agent for the clay.

*Example VIII*

The sample of whole coarse clay used in Example VII was repeatedly settled to remove substantially all particles finer than 2 microns and put through a laboratory Rafton Mill for a total of 80 passes at 58.2% solids in a deflocculated state. The following particle size distribution resulted:

TABLE XIV

| | Before Fracturing | After Fracturing |
| --- | --- | --- |
| Particle Size: | | |
| Percent plus 15 microns | 17.0 | 1.0 |
| Percent 15 to 10 microns | 18.0 | 6.0 |
| Percent 10 to 5 microns | 35.0 | 23.0 |
| Percent 5 to 2 microns | 26.0 | 32.0 |
| Percent finer than 2 microns | 4.0 | 38.0 |
| Brightness | 77.5 | 82.0 |

The fractured sample which was classified tested as follows:

TABLE XV

| Percent Finer Than 2 Microns | Brightness | | | | Percent Recovery |
| --- | --- | --- | --- | --- | --- |
| | 0 | 2 | 3 | 4 Lbs. of Bleach* per Ton of Clay | |
| 63.0 | 87.2 | 88.2 | | | 50.5 |
| 78.0 | 88.6 | 89.2 | 88.9 | 89.3 | 38.0 |
| 86.0 | 88.2 | 88.6 | | | 28.8 |

*Sodium hydrosulphite.

Coated paper sheets were made with a clay fraction having 78.0% finer than 2 microns with 2 pounds of sodium hydrosulphite bleach and with commercial intermediate grade coating clay of substantially the same size having a brightness of 86.3. The following data were obtained with these sheets:

TABLE XVI

| Coating Clay Used | Gloss | Ct. Wt. | Wax | Brightness | Parts Casein Used per 100 Parts Clay [3] |
| --- | --- | --- | --- | --- | --- |
| Commercial Intermediate Grade Coating Clay | 8.0 | 12.3 | [1] 4 | 78.9 | 10 |
| 78% minus 2 fraction treated with 2 lbs. of bleach [2] per ton of clay | 8.7 | 12.25 | [1] 4 | 83.5 | 13 |

[1] Slight.
[2] Sodium hydrosulphite.
[3] Casein is the bonding agent for the clay.

*Example IX*

Tests were conducted with three clay samples produced from the same clay deposit and which were properly designated as calcined clay, intermediate grade coating clay and fractured clay fines (clay particles of which about 80% are finer than 2 microns).

The calcined clay sample was taken from a commercial run by Burgess Pigment Company, Sandersville, Georgia. This clay was made by heating pulverized coating clay at temperatures of about 1750–1850° F. The calcined clay and intermediate grade coating clay samples were representative of these clays as supplied in commercial practice. The intermediate grade coating clay and fractured clay fines had substantially the same particle size distribution. The fractured clay fines were produced with a laboratory Rafton Mill.

The brightness value of the calcined clay and fractured clay fines was found to be 90.0, whereas the brightness value of the conventional intermediate grade coating clay was 86.0.

Paper samples were prepared by coating separate uncoated paper sheets with the calcined clay, intermediate grade coating clay, and fractured clay fines, respectively. The clays were applied to the uncoated paper of each of said samples with just enough adhesive to hold the clay to the papers, and by applying a heavy coat and using the same solids make-up and applicator in each instance. As is well recognized in the clay and paper arts, and as substantiated by these test samples, the abrasive properties of the calcined clay were considerably greater than the intermediate grade coating clay. Similarly, the calcined clay was considerably more abrasive than the fractured clay fines.

*Example X*

A sample of kaolin clay slip (deflocculated clay-water mix) from a production run was introduced into a sedimentation tank. After the sedimentation tank was filled and the clay was classified to a commercial grade, a sample was taken from the suspended fraction and was designated as the "conventional sample."

A second sample was taken from the settled coarse fraction resulting from this classification in the sedimentation tank. This coarse fraction was treated to remove substantially all of the particles finer than two microns by re-suspending the clay in water in a deflocculated state, settling, and removing and discarding the fines. The resulting coarse fraction was treated in a laboratory Rafton Mill at 56.6% solids in a deflocculated state for 58 passes. This treated slip was then classified to recover a relatively fine fraction of fractured particles. This classified fractured sample was designated as the "fractured sample."

Table XVII, infra, shows the particle size distribution of the clay before and after it was classified, whereas Table XVIII, infra, shows the particle size distribution of the clay before and after the material was treated in the laboratory Rafton Mill, and the particle size distribution of the above referred to fractured sample.

TABLE XVII

| Particle Size Distribution Based on Percent by Weight | Percent | |
|---|---|---|
| | Before Sedimentation Tank | After Sedimentation Tank |
| Plus 15 microns | 3.0 | 0.0 |
| 15 to 10 microns | 5.0 | 0.0 |
| 10 to 5 microns | 12.0 | 3.0 |
| 5 to 2 microns | 20.0 | 18.0 |
| Finer than 2 microns | 60.0 | 79.0 |

TABLE XVIII

| Particle Size Distribution Based on Percent by Weight | Percent | | |
|---|---|---|---|
| | Before Rafton Mill | After Rafton Mill | Classified After Rafton Mill |
| Plus 15 microns | 7.0 | 2.0 | 0.0 |
| 15 to 10 microns | 14.0 | 5.0 | 0.0 |
| 10 to 5 microns | 50.0 | 24.0 | 1.0 |
| 5 to 2 microns | 24.0 | 34.0 | 16.0 |
| Finer than 2 microns | 5.0 | 35.0 | 83.0 |

The above referred to conventional and fractured samples were treated with various levels of sodium hydrosulphite bleach and the brightness values of the bleached products were determined and compared with the brightness of the unbleached product. The brightness values that were obtained with these samples are shown in Table XIX, infra.

TABLE XIX

| | Lbs. of Sodium Hydrosulphite per Ton of Clay | | | |
|---|---|---|---|---|
| | 0 | 2 | 3 | 4 |
| Brightness of Conventional Sample | 84.8 | 86.2 | 86.0 | 85.8 |

| | Lbs. of Sodium Hydrosulphite per Ton of Clay | | | |
|---|---|---|---|---|
| | 0 | 1 | 2 | 3 |
| Brightness of Fractured Sample | 87.2 | 88.2 | 88.7 | 88.9 |

Based on the test data produced in this example, wherein the brightness values of classified and conventional samples having substantially the same particle size distribution were compared, the following results were obtained:

(1) Table XIX, supra, shows that the unbleached fractured sample had significantly greater brightness than the unbleaced conventional sample.

(2) Further, the bleached fractured samples had significantly greater brightness than the bleached conventional samples despite the fact that the former samples were treated with comparatively lower levels of bleach.

The foregoing data and results of this example clearly establish that the fractured clay has greater brightness than unfractured clay of substantially the same particle size distribution. The outstanding brightness of the fractured clay is based upon the initial treatment (fracturing) of coarse clay having not more than 35% by weight particles below two microns. The foregoing fracturing process enables one to use a comparatively high proportion of clays that are too coarse to be used in conventional classification procedures due to the comparatively low recovery of fine particles that normally result therefrom.

Thus, in conclusion, when coarse clay is fractured in accordance with the above procedure, the resulting fractured clay has markedly greater brightness than unfractured particles of clay having substantially the same size distribution.

*Example XI*

A sample was selected from an intermediate grade coating clay. A second sample was prepared by passing coarse clay through a Rafton Mill and classifying the fractured sample. The particle size distribution of these samples and their brightness values are shown in Table XX, infra.

TABLE XX

| Sample | Unbleached Brightness | Percent Clay Below | | | | |
|---|---|---|---|---|---|---|
| | | 5 microns | 3 microns | 2 microns | 1 micron | 0.6 micron |
| Commercial Intermediate Grade Coating Clay | 84.6 | 99 | 94 | 85 | 69 | 57 |
| Classified Fractured Clay | 87.8 | 99 | 94 | 81 | 56 | 44 |

Table XX, supra, shows that the fractured clay was brighter than the intermediate grade clay. The samples shown in Table XX, supra, were classified and the fractions of less than 0.5 micron were removed therefrom. The separated fraction of each sample was again classified into two smaller fractions, one of which had a particle size distribution of 0.5–0.2 micron and the other had a particle size distribution of less than 0.2 micron. The brightness values of these fractions below 0.5 micron are shown in Table XXI, infra.

TABLE XXI

| Sample | Brightness of Fraction | |
|---|---|---|
|  | Between 0.5–0.2 micron | Below 0.2 micron |
| Commercial Intermediate Grade Coating Clay | 85.5 | 80.0 |
| Classified Fractured Clay | 88.3 | 58.6 |

A comparison of the brightness values set forth in Tables XX and XXI, supra, shows that: the 0.5–0.2 micron fractions of the fractured clay and intermediate grade clay are brighter than the samples from which they were taken; the fractured clay in the 0.5–0.2 micron range is brighter than the intermediate grade clay in the same range; and the particles below 0.2 micron of each sample have materially lower brightness values than the samples shown in Table XX from which they were taken and the corresponding 0.5–0.2 micron samples.

Table XXII, infra, shows the brightness of the samples shown in Table XX after the particles below 0.5 micron were removed and compares these values with the values shown in Tables XX and XXI.

TABLE XXII

| Sample | Brightness of Samples of Table XX | Brightness of Samples of Table XX After Removal of Clay Below 0.5 micron | Brightness of Fraction Between 0.5–0.2 micron |
|---|---|---|---|
| Commercial Intermediate Grade Coating Clay | 84.6 | 83.0 | 85.5 |
| Classified Fractured Clay | 87.8 | 88.1 | 88.3 |

Tables XXI and XXII, supra, show that the brightness of the clay increased as its particle size decreased to 0.2 micron, and that fractured clay in the ranges of 0.5–0.2 micron and 5–0.5 microns was brighter than unfractured clay and that the brightness fractured clay fraction that was tested was in the 0.5–0.2 micron range.

*Example XII*

A sample of the coarse fraction produced in the commercial manufacture of intermediate grade coating clay was settled twice from an aqueous suspension. After each settling, the fines that were left in suspension (after a predetermined time) were discarded, and the resulting coarse particles saved. The time of settling in each case was the time required for the 2 micron particles to settle out in the bottom of the container. The particle size distribution of the coarse fraction from the settlings is shown in Table XXIII, infra.

TABLE XXIII

Particle Size distribution: Percent by weight
- Plus 15 microns _____ 9.0
- 15 to 10 microns _____ 13.0
- 10 to 5 microns _____ 45.0
- 5 to 2 microns _____ 27.0
- Finer than 2 microns _____ 6.0

Water was added to the coarse fraction to form a slurry of about 80% solids in a deflocculated state. This slurry was treated in a pug mill of the type shown in Millman et al. Patent 2,535,647 for thirty minutes. The particle size distribution after treatment is shown in Table XXIV, infra.

TABLE XXIV

Particle size distribution: Percent by weight [1]
- Plus 15 microns _____ 4.0
- 15 to 10 microns _____ 6.0
- 10 to 5 microns _____ 27.0
- 5 to 2 microns _____ 27.0
- Finer than 2 microns _____ 36.0

[1] After pug mill treatment.

The clay from the pug mill was fractionated to recover a finer fraction having the particle size distribution shown in Table XXV, infra.

TABLE XXV

Particle size distribution: Percent by weight [1]
- Plus 15 microns _____ 0.0
- 15 to 10 microns _____ 0.0
- 10 to 5 microns _____ 1.0
- 5 to 2 microns _____ 15.0
- Finer than 2 microns _____ 84.0

[1] After pug mill treatment and fractionation to finer fraction.

The fraction shown in Table XXV, supra, was treated with various levels of sodium hydrosulphite bleach and the brightness values of the bleached clay were compared with the unbleached clay. The brightness values are shown in Table XXVI, infra:

TABLE XXVI

|  | Lbs. of Sodium Hydrosulphite per Ton of Clay | | | | |
|---|---|---|---|---|---|
|  | 0 | 1 | 2 | 3 | 4 |
| Brightness of Clay Shown in Table XXV | 88.2 | 88.5 | 88.6 | 89.4 | 89.6 |

The phrase "fracturing by milling" in the claims refers to the fracturing of kaolinitic clay particles by milling, such as is effected, for example, by the use of pug mills (kneading) and Rafton mills (impact and/or shear) of the type shown in U.S. Patents 2,535,647 and 2,448,049, respectively, wherein the particles are subjected to rupturing or shearing forces which cause the kaolinitic clay particles that are treated (i.e., not more than 35% by weight finer than 2 microns) to have an increase of particles finer than 2 microns and greater brightness on the brightness scale as compared to unfractured clay of substantially the same particle size.

The foregoing detailed description has been given for clearness of understanding only and no unnecessary limitations should be understood therefrom, as modifications will be obvious to those skilled in the art.

I claim:

1. Kaolinitic clay of fracture-induced brightness consisting essentially of classified mill-fractured remnants of naturally occurring larger clay particles from kaolinitic clay having not more than 35% by weight particles below 2 microns (equivalent spherical diameter), and having at least about 40% by weight clay particles finer than 2 microns (equivalent spherical diameter), higher gloss and at least about 0.5 increased brightness on the brightness scale, and whiter color, as compared to unfractured particles of kaolinitic clay of substantially the same particle size and from the same source.

2. Kaolinitic clay as set forth in claim 1 having substantially no vermicules oriented with the plates substantially perpendicular to the supporting plane.

3. Kaolinitic clay as set forth in claim 1 which is dilatant in aqueous slurries having at least 55% by weight of said clay.

4. Kaolinitic clay as set forth in claim 1 in which the particles are thinner, more irregularly shaped, and less hexagonal than unfractured clay particles of substantially the same particle size and from the same source.

5. Kaolinitic clay as set forth in claim 1 in which the brightness of the clay product is in excess of 88.0.

6. Kaolinitic clay of fracture-induced brightness consisting essentially of classified mill-fractured remnants of naturally occurring larger clay particles from kaolinitic clay having not more than 35% by weight particles below 2 microns (equivalent spherical diameter); having at least about 40% by weight clay particles finer than 2 microns (equivalent spherical diameter), higher gloss and at least about 0.5 increased brightness on the brightness scale, as compared to unfractured particles of kaolinitic clay of substantially the same particle size and from the same source; having particles which are thinner, which have a more irregular outline and are less hexagonal, as compared with said unfractured particles; having an improved blue-white color that is at least comparable with English clays of the same particle size; being substantially free of unfractured vermicules and composed substantially of fractured remnants of vermicules; containing a sufficient amount of clay particles of more than 2 microns (electron micrograph face diameter) in size so as to predominate on a weight basis; having particles in excess of 2 microns (electromicrograph diameter) in size having a ratio of diameter to thickness in excess of 6 and a ratio of diameter to thickness which increases as the diameter of the particles increases.

7. Kaolinitic clay as set forth in claim 6 having substantially no vermicules oriented with the plates substantially perpendicular to the supporting plane and being dilatant in aqueous slurries having at least 55% by weight of said clay.

8. Kaolinitic clay of fracture-induced brightness consisting essentially of classified mill-fractured remnants of naturally occurring larger clay particles from kaolinitic clay having not more than 35% by weight particles below 2 microns (equivalent spherical diameter), and having at least about 67% by weight clay particles finer than 2 microns (equivalent spherical diameter), higher gloss and at least about 0.5 increased brightness on the brightness scale, as compared to unfractured particles of kaolinitic clay of substantially the same particle size and from the same source.

9. Kaolinitic clay as set forth in claim 8 having substantially no vermicules oriented with the plates substantially perpendicular to the supporting plane and in which the brightness of the clay product is in excess of 88.0.

10. Kaolinitic clay of fracture-induced brightness consisting essentially of classified mill-fractured remnants of naturally occurring larger clay particles from kaolinitic clay; having at least about 67% by weight clay particles finer than 2 microns (equivalent spherical diameter), higher gloss, a brightness in excess of 88.0, and at least about 0.5 increased brightness on the brightness scale, as compared to unfractured particles of kaolinitic clay of substantially the same particle size and from the same source; giving uncalendered coated paper with improved brightness and gloss, as compared with conventional clays of the same particle size; having particles which are thinner, which have a more irregular outline and are less hexagonal, as compared with conventional particles of the same particle size; having an improved blue-white color that is at least comparable with English clays of the same particle size; being substantially free of unfractured vermicules and composed substantially of fractured remnants of vermicules; containing a sufficient amount of clay particles of more than 2 microns (electron micrograph face diameter) in size so as to predominate on a weight basis; having particles in excess of 2 microns (electron micrograph diameter) in size having a ratio of diameter to thickness which increases as the diameter of the particles increases; and, if calcined, having an increased brightness and lower abrasion index than conventional calcined clays of comparable size.

11. Kaolinitic clay of fracture-induced brightness consisting essentially of classified mill-fractured remnants of naturally occurring larger clay particles from kaolinitic clay having not more than 35% by weight particles below 2 microns (equivalent spherical diameter); having at least about 40% by weight clay particles finer than 2 microns (equivalent spherical diameter), higher gloss and at least about 0.5 increased brightness on the brightness scale, as compared to unfractured particles of kaolinitic clay of substantially the same particle size and from the same source; having particles which are thinner, which have a more irregular outline and are less hexagonal, as compared with said unfractured particles; having an improved blue-white color that is at least comparable with English clays of the same particle size; containing a sufficient amount of clay particles of more than 2 microns (electron micrograph face diameter) in size so as to predominate on a weight basis.

12. Kaolinitic clay as set forth in claim 11 having substantially no vermicules oriented with the plates substantially perpendicular to the supporting plane and being dilatant in aqueous slurries having at least 55% by weight of said clay.

13. Paper coated with the clay of claim 1.

References Cited

UNITED STATES PATENTS

| | | | |
|---|---|---|---|
| 2,305,404 | 12/1942 | Brown | 106—72 |
| 2,677,619 | 5/1954 | Eirich et al. | 106—72 |
| 2,987,473 | 6/1961 | Millman et al. | 106—72 |
| 3,171,718 | 3/1965 | Gunn et al. | 106—72 |

TOBIAS E. LEVOW, *Primary Examiner.*

J. E. POER, *Assistant Examiner.*